US009545047B2

(12) United States Patent
Knetzer et al.

(10) Patent No.: US 9,545,047 B2
(45) Date of Patent: Jan. 17, 2017

(54) DISK BLADE SPINDLE

(71) Applicant: CNH Industrial America LLC, New Holland, PA (US)

(72) Inventors: Edward W. Knetzer, Peoria, IL (US); Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/456,489

(22) Filed: Aug. 11, 2014

(65) Prior Publication Data

US 2015/0053445 A1 Feb. 26, 2015

Related U.S. Application Data

(60) Provisional application No. 61/868,310, filed on Aug. 21, 2013.

(51) Int. Cl.
*A01B 21/08* (2006.01)
(52) U.S. Cl.
CPC .................. *A01B 21/086* (2013.01)
(58) Field of Classification Search
CPC ....... A01B 15/16; A01B 15/18; A01B 21/086; A01B 71/04; A01B 23/06; A01B 21/083; A01B 21/08; A01B 5/04; A01B 5/06; A01B 33/14–33/144
See application file for complete search history.

(56) References Cited

U.S. PATENT DOCUMENTS

| 2,566,991 | A | * | 9/1951 | McKay | .................. A01B 23/06 384/460 |
| 3,238,615 | A | | 3/1966 | Leone et al. | |
| 3,271,853 | A | | 9/1966 | Pfister | |
| 3,300,856 | A | | 1/1967 | Daugherty | |
| 3,587,873 | A | | 6/1971 | Lohneis | |
| 3,635,569 | A | | 1/1972 | Sato et al. | |
| 3,640,348 | A | * | 2/1972 | Womble | .................. A01B 21/08 111/926 |
| 3,842,712 | A | | 10/1974 | Bondie et al. | |
| 4,121,332 | A | | 10/1978 | Corsi | |

(Continued)

FOREIGN PATENT DOCUMENTS

FR   1 269 969   8/1961
GB   639 267     6/1950

(Continued)

OTHER PUBLICATIONS

"A Comparison of Stiffness Characteristics of Serial and Parallel Machine Tools", Tlusty et al, Journal of Manufacturing Processes, vol. 2, Issue 1, 2000, pp. 67-76 (10 pages).

(Continued)

*Primary Examiner* — Matthew D Troutman
(74) *Attorney, Agent, or Firm* — Rebecca L. Henkel; Rickard K. DeMille

(57) ABSTRACT

An agricultural tillage implement includes: a frame member; and a disk blade hanger assembly. The disk blade hanger assembly includes: a disk blade hanger coupled with the frame member; a disk blade; and a spindle assembly including a spindle and a saddle member, the spindle being rotationally coupled with the disk blade, the saddle member being connected to the disk blade hanger and including a curved surface which is connected to the spindle.

16 Claims, 5 Drawing Sheets

(56) References Cited

U.S. PATENT DOCUMENTS

| | | | | |
|---|---|---|---|---|
| 4,250,970 A * | 2/1981 | Pfenninger | A01B 63/32 | 172/142 |
| 4,333,535 A * | 6/1982 | Hentrich, Sr. | A01B 21/08 | 172/566 |
| 4,407,372 A * | 10/1983 | Rozeboom | A01B 61/04 | 172/572 |
| 4,724,910 A * | 2/1988 | Wheeler | A01B 61/046 | 172/178 |
| 4,809,422 A | 3/1989 | Kitamura | | |
| 5,042,590 A * | 8/1991 | Bierl | A01B 21/08 | 172/572 |
| 5,267,619 A * | 12/1993 | Eversole | A01B 23/06 | 172/572 |
| 5,282,375 A | 2/1994 | Lee, Jr. et al. | | |
| 5,397,187 A * | 3/1995 | Cachinero | A01B 71/04 | 384/460 |
| 5,437,433 A | 8/1995 | Rezek | | |
| 5,628,373 A * | 5/1997 | Domries | A01B 21/08 | 172/574 |
| 6,024,179 A * | 2/2000 | Bourgault | A01B 15/18 | 172/558 |
| 6,158,523 A * | 12/2000 | Gengler | A01B 15/18 | 172/572 |
| 6,286,870 B1 | 9/2001 | Mulder et al. | | |
| 6,913,085 B2 * | 7/2005 | Ruckle | A01B 71/04 | 111/164 |
| RE38,974 E * | 2/2006 | Gengler | A01B 15/18 | 172/572 |
| 7,073,949 B2 * | 7/2006 | Ruckle | A01B 71/04 | 172/394 |
| 7,481,279 B2 * | 1/2009 | Blunier | A01B 23/06 | 172/509 |
| 8,413,739 B2 * | 4/2013 | Casper | A01B 21/083 | 172/572 |
| 2004/0245004 A1 * | 12/2004 | Ruckle | A01B 71/04 | 172/394 |
| 2006/0225901 A1 * | 10/2006 | Blunier | A01B 23/06 | 172/558 |
| 2011/0220375 A1 * | 9/2011 | Connell, Jr. | A01B 71/04 | 172/518 |

FOREIGN PATENT DOCUMENTS

| | | |
|---|---|---|
| GB | 743 522 | 1/1956 |
| GB | 793 107 | 4/1958 |

OTHER PUBLICATIONS

Sensus Metering Systems, Mainline Propeller Meters, Welding Saddle Type Meter Models 119/120, 2013 (2 pages).

* cited by examiner

US 9,545,047 B2

DISK BLADE SPINDLE

CROSS REFERENCE TO RELATED APPLICATIONS

This is a non-provisional application based upon U.S. provisional patent application Ser. No. 61/868,310, entitled "DISK BLADE SPINDLE", filed Aug. 21, 2013 which is incorporated herein by reference.

BACKGROUND OF THE INVENTION

1. Field of the Invention

The present invention relates to agricultural implements, and, more particularly, to disk blade spindles of agricultural tillage implements.

2. Description of the Related Art

Farmers utilize a wide variety of tillage implements to prepare soil for planting. Some such implements include two or more sections coupled together to perform multiple functions as they are pulled through fields by a tractor, for example, a cultivator/harrow which is capable of simultaneously tilling soil and leveling the tilled soil in preparation for planting. This implement includes a cultivator that is towed by a tractor, and a harrow that is towed by the cultivator.

In one type of tilling operation, rows or gangs of circular disk blades are pulled through the soil at variable depths to break up clods or lumps of soil, as well as old plant material to provide a more amenable soil structure for planting and to level the soil surface. The gangs of disks are arranged on frames that extend generally laterally with respect to the direction of movement through a field and more particularly are angled with respect to the direction of movement.

A disk blade can be attached to the frame member (such as a frame tube) by way of a disk blade hanger. Fixedly attached to the disk blade hanger is a spindle about which the disk blade rotates, such as by way of a rotating drum. The spindle is a round spindle which is welded directly to a flat plate, which is attached to the disk blade hanger. When the round spindle is welded to the flat plate, the welds are close together, and it is difficult to securely and consistently adhere the round spindle to the flat plate with welds. Likewise, the loading of the welds occurs at a distance from the centerline of the spindle which, in turn, adds excessive leverage to the assembly.

What is needed in the art is a way to strengthen, and to more easily provide for, the connection between the spindle and the disk blade hanger.

SUMMARY OF THE INVENTION

The present invention provides a saddle member connecting the disk blade hanger to the spindle, the saddle member having a curved surface which matches the rounded surface of the spindle and which is directly connected to the spindle.

The invention in one form is directed to an agricultural tillage implement which includes: a frame member; and a disk blade hanger assembly. The disk blade hanger assembly includes: a disk blade hanger coupled with the frame member; a disk blade; and a spindle assembly including a spindle and a saddle member, the spindle being rotationally coupled with the disk blade, the saddle member being connected to the disk blade hanger and including a curved surface which is connected to the spindle.

The invention in another form is directed to a disk blade hanger assembly of an agricultural tillage implement including a frame member. The disk blade hanger assembly includes: a disk blade hanger configured for being coupled with the frame member; a disk blade; and a spindle assembly including a spindle and a saddle member, the spindle being rotationally coupled with the disk blade, the saddle member being connected to the disk blade hanger and including a curved surface which is connected to the spindle.

The invention in yet another form is directed to a disk blade hanger assembly of an agricultural tillage implement including a frame member. The disk blade hanger assembly includes: a spindle assembly including a spindle and a saddle member, the spindle being configured for being rotationally coupled with a disk blade, the saddle member being configured for being connected to a disk blade hanger configured for being coupled with the frame member, the saddle member including a curved surface which is connected to the spindle.

An advantage of the present invention is that it provides a disc blade spindle weldment which is more secure.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
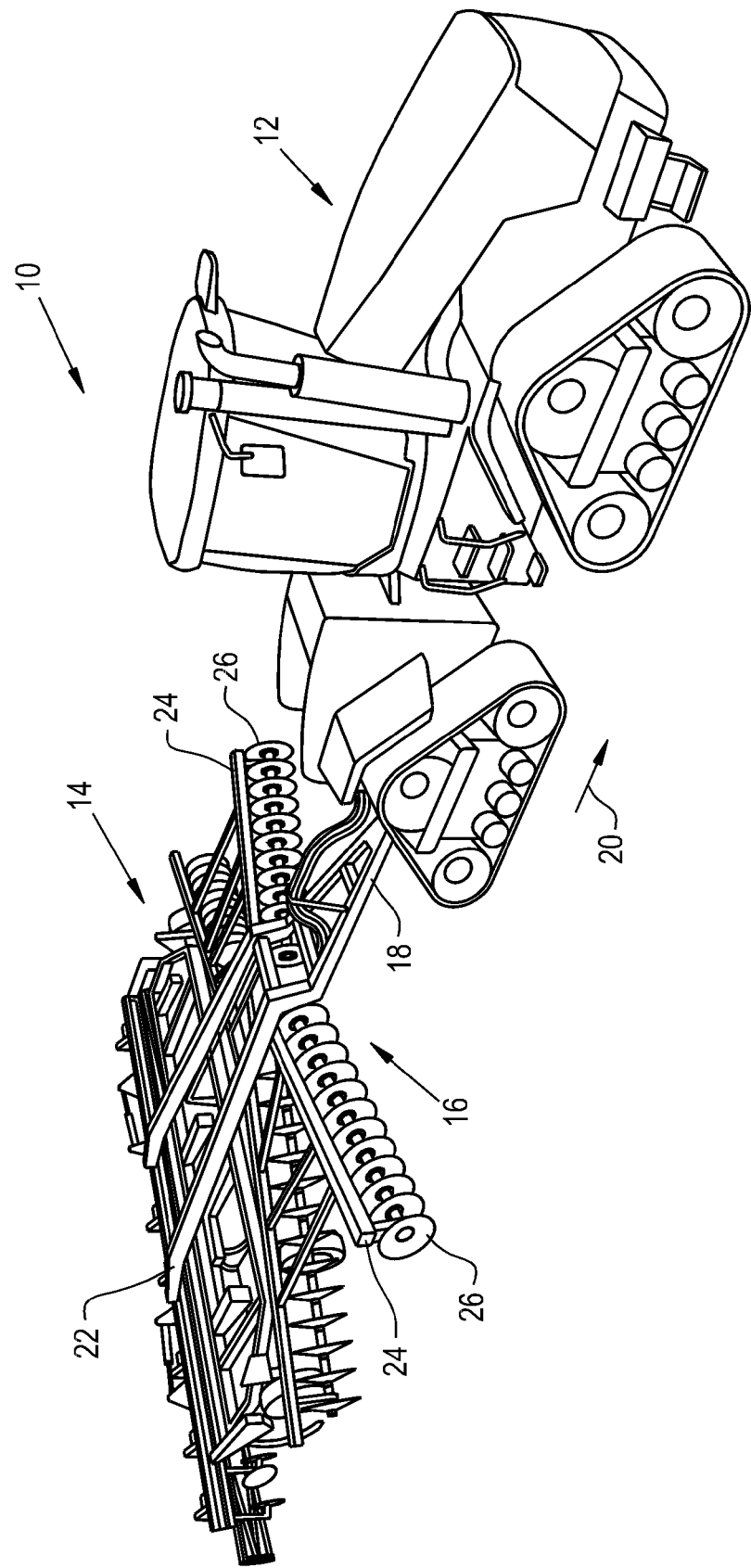
FIG. 1 illustrates schematically an agricultural tillage implement being pulled by a tractor.
Figure 2:
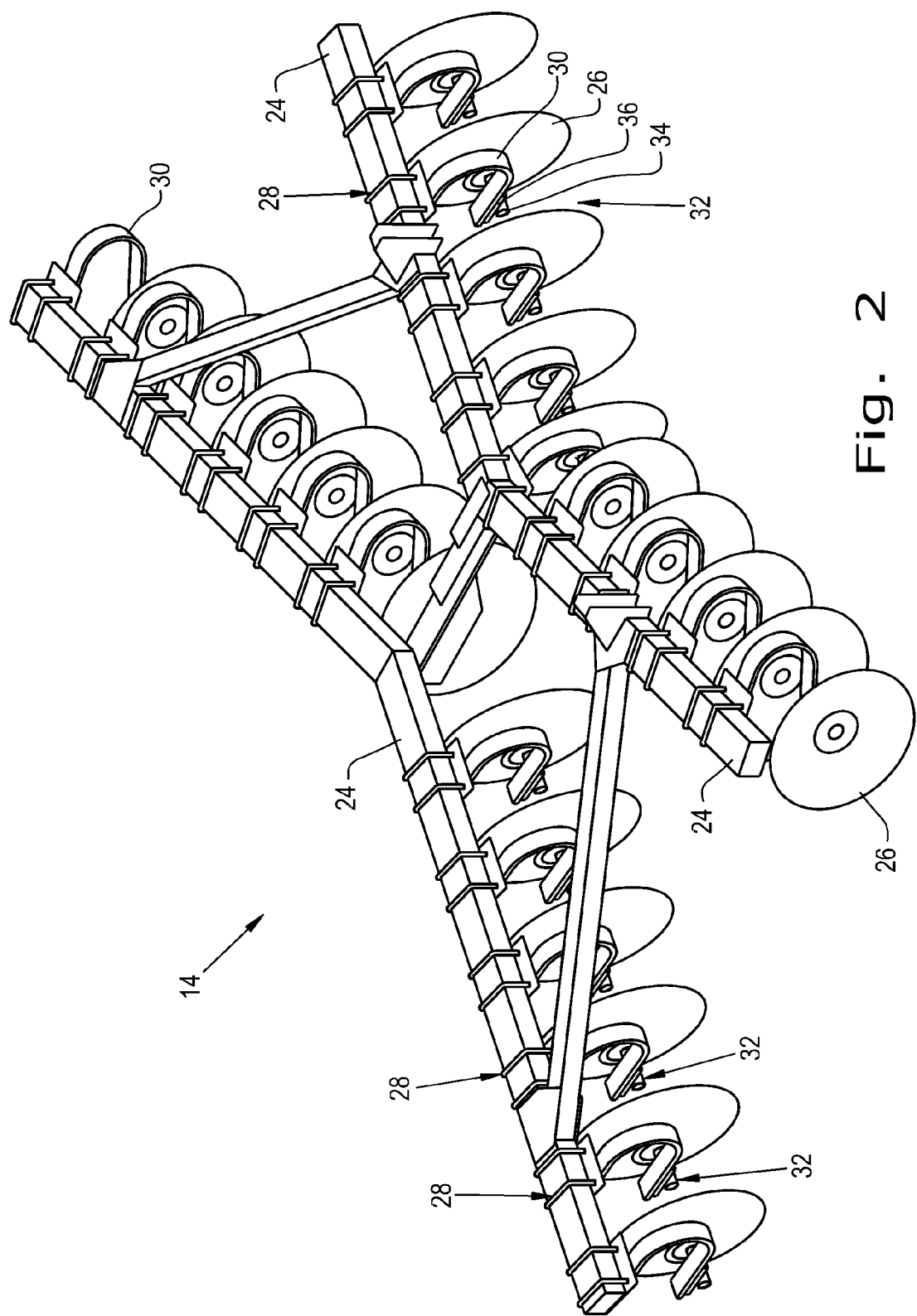
FIG. 2 is a perspective view of an embodiment of the agricultural tillage implement of the present invention, with portions broken away.

Referring now to the drawings, and more particularly to FIG. 1, there is shown a tillage apparatus 10 which generally includes a tractor 12 and an agricultural tillage implement 14 for tilling and finishing soil prior to seeding. Agricultural tillage implement 14 is configured as a multi-section field disk ripper 14, and includes a main frame section 16. Main frame section 16 is the section that is directly towed by a traction unit, such as agricultural tractor 12. Main frame section 16 includes a pull hitch 18 generally extending in a travel direction 20, and a frame member 22 which is coupled with and extends from pull hitch 18. Main frame section 16 additionally functions to carry a plurality of frame members 24 which carry gangs of disk blades 26 for tilling the soil. FIG. 1 schematically shows disk blades 26 attached to frame members 24. FIG. 2 shows disk blades 26 attached to frame members 24 in an embodiment of the present invention.

Figure 3:
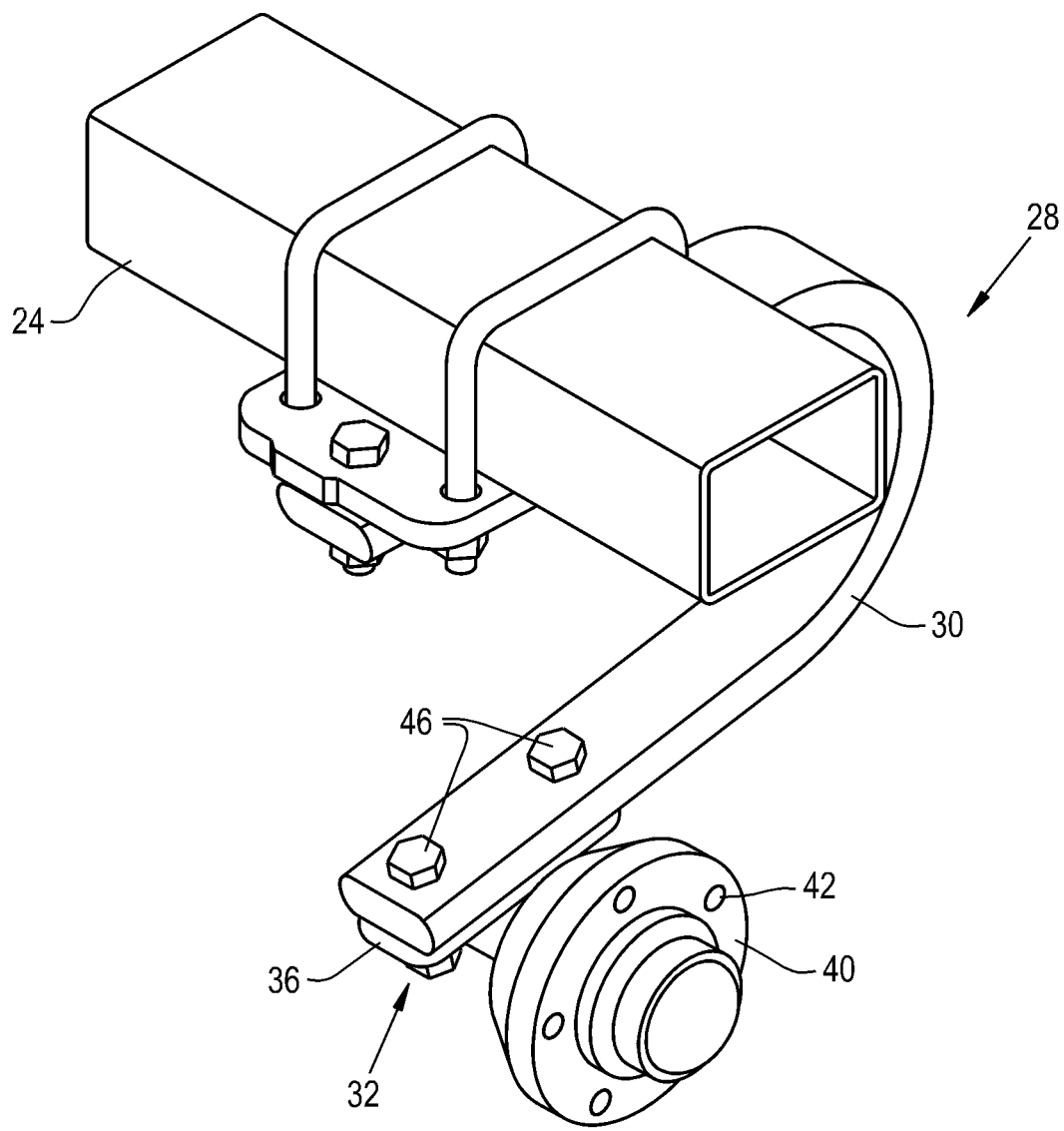
FIG. 3 is a perspective view of the agricultural tillage implement of FIG. 2, with portions broken away.

As shown in FIGS. 2 and 3, agricultural tillage implement 14 includes frame member 24 and a disk blade hanger assembly 28. Frame member 24 can have a square or rectangular cross-section, for example, and can be referred to as a frame tube 24. Frame member 24 can be made of steel, for example. As shown in the figures, frame member 24 can be attached to disk blade hanger 30 of disk blade hanger assembly 28 by way of a substantially flat plate, and a plurality of curved bolts, and a plurality of nuts. This way of attachment is provided by way of example and not by way of limitation.

Figure 4:
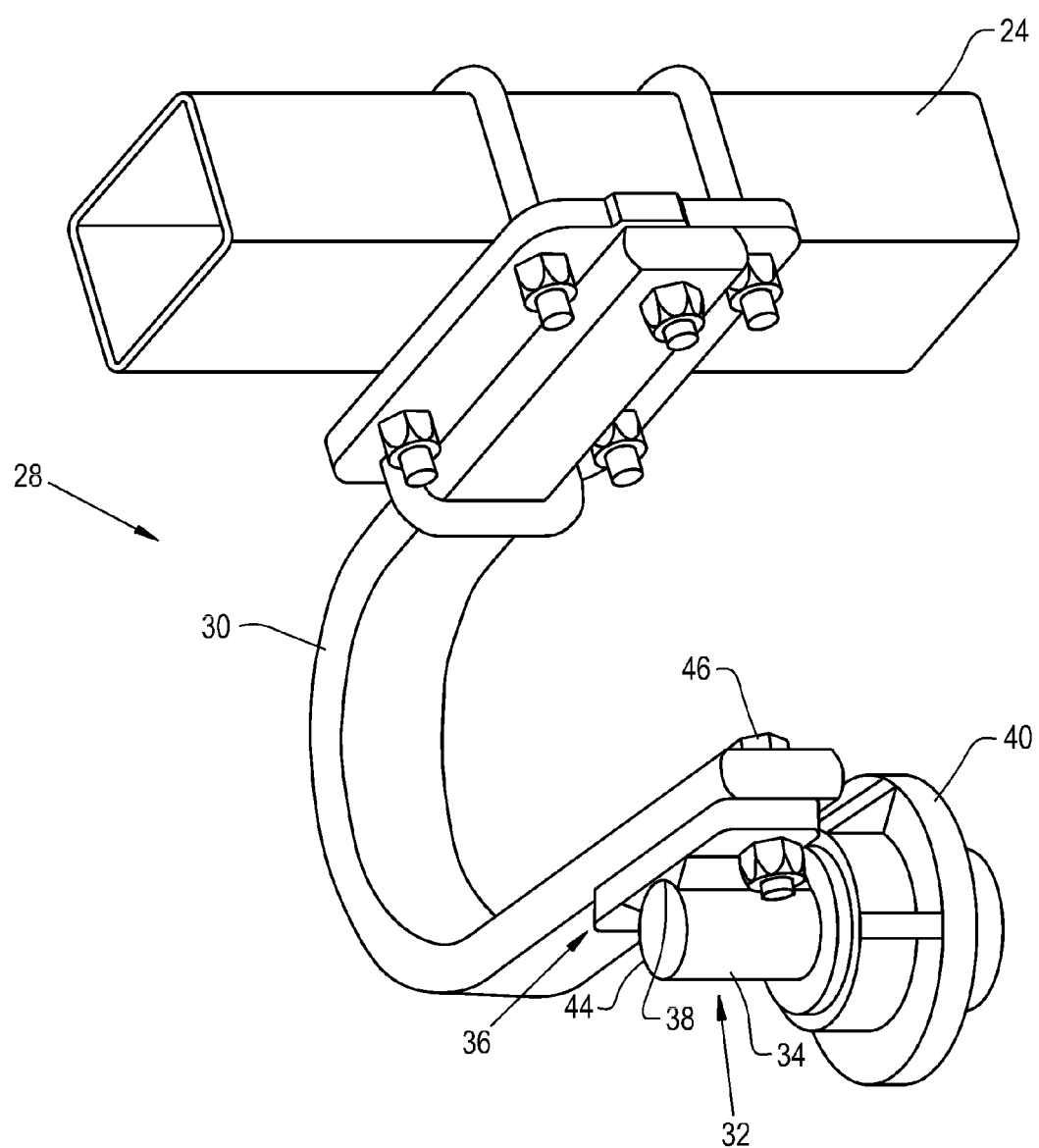
FIG. 4 is a perspective view of the agricultural tillage implement of FIG. 2, with portions broken away.
Figure 5:
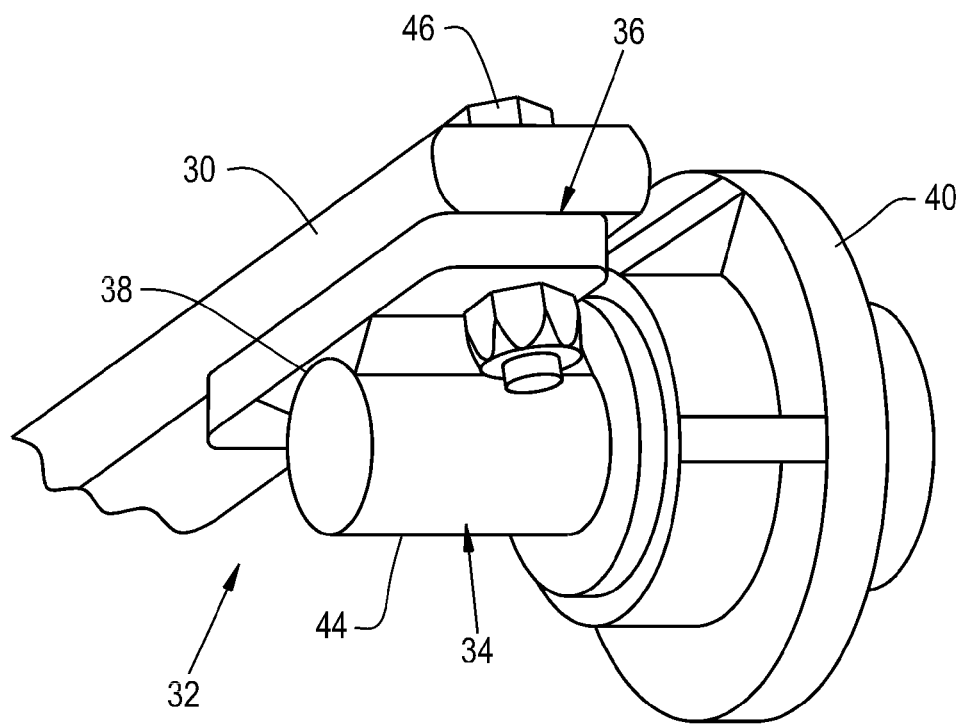
FIG. 5 is a perspective view of the disk blade hanger assembly of FIG. 2, with portions broken away.

As shown in FIGS. 3 to 5, according to one embodiment of the present invention, disk blade hanger assembly 28 includes: a disk blade hanger 30 coupled with frame member 22; disk blade 26; and a spindle assembly 32 including a spindle 34 and a saddle member 36, spindle 34 being rotationally coupled with disk blade 26, saddle member 36 being connected to disk blade hanger 30 and including a curved surface 38 which is connected to spindle 34. According to another embodiment of the present invention, disk blade hanger assembly 28 includes disk blade hanger 30 configured for being coupled with frame member 24; disk blade 26; and spindle assembly 32 including spindle 34 and saddle member 36, spindle 34 being rotationally coupled with disk blade 26, saddle member 36 being connected to disk blade hanger 30 and including curved surface 38 which is connected to spindle 34. According to yet another embodiment of the present invention, disk blade hanger assembly 28 includes spindle assembly 32 including spindle 34 and saddle member 36, spindle 34 being configured for being rotationally coupled with disk blade 26, saddle member 36 being configured for being connected to disk blade hanger 30 configured for being coupled with frame member 22, saddle member 36 including curved surface 38 which is connected to spindle 34.

As shown in FIGS. 3 and 4, disk blade hanger 30 includes a proximal end and a distal end. At the proximal end of disk blade hanger 30, disk blade hanger 30 is attached to frame tube 24. At the distal end of disk blade hanger 30, disk blade hanger 30 is attached to at least one disk blade 26 by way of spindle assembly 32. Disk blade hanger 30 can be made of steel, for example.

Disk blade 26 travels (such as by rotating) across the ground and tills the soil. Disk blade 26 can be made of steel. Disk blade 26 can be considered to be a disk blade assembly 26 including a drum 40 and the actual disk which contacts the ground. The disk of disk blade 26 is shown in FIGS. 1 and 2 but is not otherwise independently numbered in the figures. This disk can be fastened to drum 40 by way of, for example, nuts and bolts using holes 42 and thus rotate with drum 40.

As shown in FIGS. 3 to 5, spindle assembly 32 includes spindle 34 and saddle member 36. Spindle 34 is coupled with disk blade 26 by way of drum 40, drum 40 rotating on spindle 34. Spindle 34 is a round spindle and thus has a round cross-section and a round surface 44. Spindle 34 can be made of steel, for example.

Saddle member 36 can be made of steel, for example, and can be made by a casting operation. Saddle member 36 can thus be a casting and be referred to as a saddle member casting 36. In this way, saddle member 36 can be one monolithic piece. FIGS. 4 and 5 show that saddle member 36 can have a flat plate portion and a curved portion. The flat plate portion can be fastened to the underside of the distal end of disk blade hanger 30 by way of fasteners, such as nuts and bolts 46, as shown in the figures. In this way, saddle member 36 is configured for fastening to disk blade hanger 30.

The curved portion of saddle member 36 includes a curved surface 38 which is connected to spindle 34. More specifically, curved surface 38 of saddle member 36 can be welded to round surface 44 of spindle 34 (stated another way, round surface 44 of spindle 34 is welded to curved surface 38 of saddle member 36). In this way spindle 34 and saddle member 36 together form a spindle weldment, which includes round spindle 34 welded to saddle member casting 36. The curved portion of saddle member 36 can thus cover an upper portion of spindle 34 and thus be cast to match the corresponding upper portion of spindle 34. In one embodiment, the curved portion of saddle member 36 can have a half-round shape which is cast to match the upper half of spindle 34. A weld can be placed all along the matching contact surfaces 38, 44 relative to the curved portion of saddle member 36 and the corresponding rounded contour of spindle 34. As can be seen, the curved portion of saddle member 36 may connect to only a portion of the circumference of the round spindle 34, such as the upper half of spindle 34, rather than connecting to the entire circumference of round spindle 34. Such a configuration can leave some or all of the bottom of spindle 34, such as the bottom half, unsupported and reduce the weight of the disk blade hanger assembly 28.

By virtue of the saddle shape of saddle member 36 for (and thus matching) the round shape of spindle 34, an advantageous weldment can be formed. More specifically, the resulting contact geometry according to the present invention (that is, the matching rounded contours of saddle member 36 and round spindle 34) advantageously results in: (1) additional surface area (as opposed to a round spindle welded to a flat plate) for the weld securing saddle member 36 and spindle 34 together; (2) the welds being closer to the neutral axis of spindle 34 and the amount of stress thereby being reduced on the weldment (the weldment including saddle member 36 and spindle 34 welded together); and (3) the welds being further apart and thereby gaining additional support and reducing the amount of stress on the weldment. In this way, the present invention advantageously provides a disc blade spindle weldment (which is spindle assembly 32).

In use, disk blades 26 rotate on spindle 34 during what can be rigorous application across an uneven field. Because of the contact geometry between spindle 34 and disk blade hanger 30 by way of saddle member 36 and the weld placed therebetween, the connection between spindle 34 and disk blade hanger 30 is more secure and can thus better withstand such rigorous application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a frame member; and
   a disk blade hanger assembly including:
      a disk blade hanger coupled with said frame member and comprising a C-shaped bend;
      a disk blade including a drum; and
      a spindle assembly including a spindle and a saddle member having a flat plate portion fastened to said disk blade hanger, said disk blade being rotationally coupled with said spindle by said drum, said drum being rotatable about an axis of rotation defined by said spindle, said saddle member being connected to said disk blade hanger and including a curved surface which is connected to only a portion of a circumferential surface of said spindle.

2. The agricultural tillage implement of claim 1, wherein said saddle member is a casting.

3. The agricultural tillage implement of claim 1, wherein said spindle includes a round surface which is welded to said curved surface of said saddle member.

4. A disk blade hanger assembly of an agricultural tillage implement including a frame member, said disk blade hanger assembly comprising:
   a disk blade hanger configured for being coupled with the frame member and comprising a C-shaped bend;
   a disk blade including a drum; and
   a spindle assembly including a spindle and a saddle member having a flat plate portion fastened to said disk blade hanger, said spindle disk blade being rotationally coupled with said spindle by said drum, said drum being rotatable about an axis of rotation defined by said spindle, said saddle member being connected to said disk blade hanger and including a curved surface which is connected to only a portion of a circumferential surface of said spindle.

5. The disk blade hanger assembly of claim 4, wherein said saddle member is a casting.

6. The disk blade hanger assembly of claim 4, wherein said spindle includes a round surface which is welded to said curved surface of said saddle member.

7. A disk blade hanger assembly of an agricultural tillage implement including a frame member, said disk blade hanger assembly comprising:
   a disk blade hanger configured for being coupled with the frame member and comprising a C-shaped bend; and
   a spindle assembly including a spindle and a saddle member connected to said disk blade hanger, said spindle being configured for being rotationally coupled with and defining an axis of rotation of a drum of a disk blade, said saddle member including a curved surface which is connected to only a portion of a circumferential surface of said spindle, said curved surface extending an entire width of said saddle member, said width of said saddle member being defined parallel to said axis of rotation.

8. The disk blade hanger assembly of claim 7, wherein said saddle member is a casting.

9. The disk blade hanger assembly of claim 8, wherein said saddle member has a flat plate portion configured for fastening to said disk blade hanger.

10. The disk blade hanger assembly of claim 9, wherein said spindle includes a round surface which is welded to said curved surface of said saddle member.

11. The agricultural tillage implement of claim 1, wherein said curved surface connects to an upper half of said spindle.

12. The agricultural tillage implement of claim 1, wherein a bottom of said spindle is unsupported.

13. The disk blade hanger assembly of claim 4, wherein said curved surface connects to an upper half of said spindle.

14. The disk blade hanger assembly of claim 4, wherein a bottom of said spindle is unsupported.

15. The disk blade hanger assembly of claim 7, wherein said curved surface connects to an upper half of said spindle.

16. The disk blade hanger assembly of claim 7, wherein a bottom of said spindle is unsupported.

* * * * *